United States Patent [19]

Nakajima et al.

[11] Patent Number: 5,490,192
[45] Date of Patent: Feb. 6, 1996

[54] FUEL ASSEMBLY

[75] Inventors: Junjiro Nakajima, Hitachi; Koji Nishida, Hitachiota; Satoshi Kanno, Hitachi; Tadashi Mizuno, Kitaibaraki; Yasunori Bessho, Mito; Masahisa Inagaki; Yasuhiro Aizawa, both of Hitachi, all of Japan

[73] Assignees: Hitachi, Ltd., Tokyo; Hitachi Engineering Co., Ltd., Ibaraki; Toshiba Corporation, Kanagawa, all of Japan

[21] Appl. No.: 247,854

[22] Filed: May 23, 1994

[30] Foreign Application Priority Data

May 25, 1993 [JP] Japan .................... 5-122333

[51] Int. Cl.⁶ ............................................ G21C 3/34
[52] U.S. Cl. ..................... 376/441; 376/442; 376/448; 376/439
[58] Field of Search ............................ 376/441, 442, 376/448, 453, 439; 976/DIG. 80; 140/102, 101

[56] References Cited

U.S. PATENT DOCUMENTS

| | | | |
|---|---|---|---|
| 3,890,196 | 6/1975 | Chetter | 376/441 |
| 3,904,475 | 9/1975 | Tashima | 376/441 |
| 4,411,862 | 10/1983 | Leclercq et al. | 376/442 |
| 4,508,679 | 4/1985 | Matzner et al. | 376/438 |
| 4,544,522 | 10/1985 | Curulla et al. | 376/441 |
| 5,002,726 | 3/1991 | Johansson | 376/448 |
| 5,069,864 | 12/1991 | Johansson | 376/441 |
| 5,085,827 | 2/1992 | Johansson | 376/444 |
| 5,173,252 | 12/1992 | Johansson | 376/448 |
| 5,192,496 | 3/1993 | Soneda et al. | 376/426 |
| 5,361,288 | 11/1994 | Johansson | 376/441 |

*Primary Examiner*—Donald P. Walsh
*Assistant Examiner*—Meena Chelliah
*Attorney, Agent, or Firm*—Antonelli, Terry, Stout & Kraus

[57] ABSTRACT

A fuel assembly comprises a plurality of fuel rods, tie plates for holding both ends of these fuel rods, and spacers which support these fuel rods. The spacer comprises a plurality of cells into which the fuel rods are inserted respectively, the adjacent cells being joined to each other at axial ends thereof, whereby a space between these cells being held or retained, and a plurality of loop springs held respectively on the cells. Each of the loop springs has a pair of resilient members which are located within the pair of adjacent cells and which urge the fuel rods in a radial direction, and a pair of connections which connect axial ends of the resilient members to each other. Each of the connections have a passage through which coolant flows axially and which is defined by a closed peripheral wall. The closed peripheral wall is not uniform in thickness. The pair of adjacent cells have at axial end portions of peripheral walls openings for accommodating or receiving the connections of the loop spring.

19 Claims, 8 Drawing Sheets

5,490,192

FUEL ASSEMBLY

BACKGROUND OF THE INVENTION

FIELD OF THE INVENTION AND RELATED ART STATEMENT

The present invention relates to fuel assemblies and, more particularly, to a fuel assembly which is suitable for use in a boiling water reactor and which has ferrule spacers of round-cell type.

Generally, the fuel assembly is provided with a plurality of fuel rods and a single water rod, and upper and lower tie plates which hold or retain both ends of these rods. Further, these rods are supported with their spacings retained by spacers. The fuel assembly is accommodated or received within a channel box.

As a spacer which is used in the fuel assembly of this kind, there is a spacer disclosed in U.S. Pat. No. 5,173,252. The spacer is provided with a plurality of cells into which the fuel rods are respectively inserted, and a plurality of loop springs which are held or retained by pairs of adjacent cells, respectively. Each of the loop springs is provided with a pair of resilient members which radially urge the fuel rods and a pair of connecting members which connect axial ends of the resilient members to each other. The connecting members have passages through which coolant flows axially.

In the conventional spacers, the passage in the connecting member of the loop spring is defined by a closed circumferential wall. Moreover, a thickness of peripheral walls is uniform. For this reason, if the loop springs are arranged within flow of the coolant, fluctuation of flow of the coolant causes the loop springs to be inclined in opposite directions around an axis which passes through abutting points between the fuel rods and the resilient members. Thus, repeated sliding movement occurs between the fuel rods and the resilient members of the loop springs so that both of them sustain damage.

OBJECT AND SUMMARY OF THE INVENTION

It is an object of the invention to provide a fuel assembly in which repeated sliding movement does not occur between fuel rods and resilient members of loop springs so that damage is not caused to both of them.

In order to achieve the object, according to the invention, there is provided a fuel assembly comprising:

a plurality of fuel rods;

tie plate means for holding opposite ends of the fuel rods; and a spacer for supporting the fuel rods, the spacer including:

a plurality of cells, into which the fuel rods are respectively inserted, the cells adjacent one another being connected to each other at axial ends thereof, thereby maintaining mutual positional relationships of the cells;

a plurality of loop springs held by the cells, each of the loop springs being provided with a pair of resilient members located in a pair of the cells adjacent to each other and urging the fuel rods radially and with a pair of connecting members connecting axial ends of the resilient members, each of the connecting members having a passage through which coolant flows axially and which is defined by a closed circumferential wall, a thickness of which wall is not constant; and openings formed in opposite axial end portions of circumferential wall of one of the pair of cells adjacent to each other and receiving the connecting members of the loop spring.

DETAILED DESCRIPTION OF THE PREFERRED EMBODIMENTS

Figure 1:
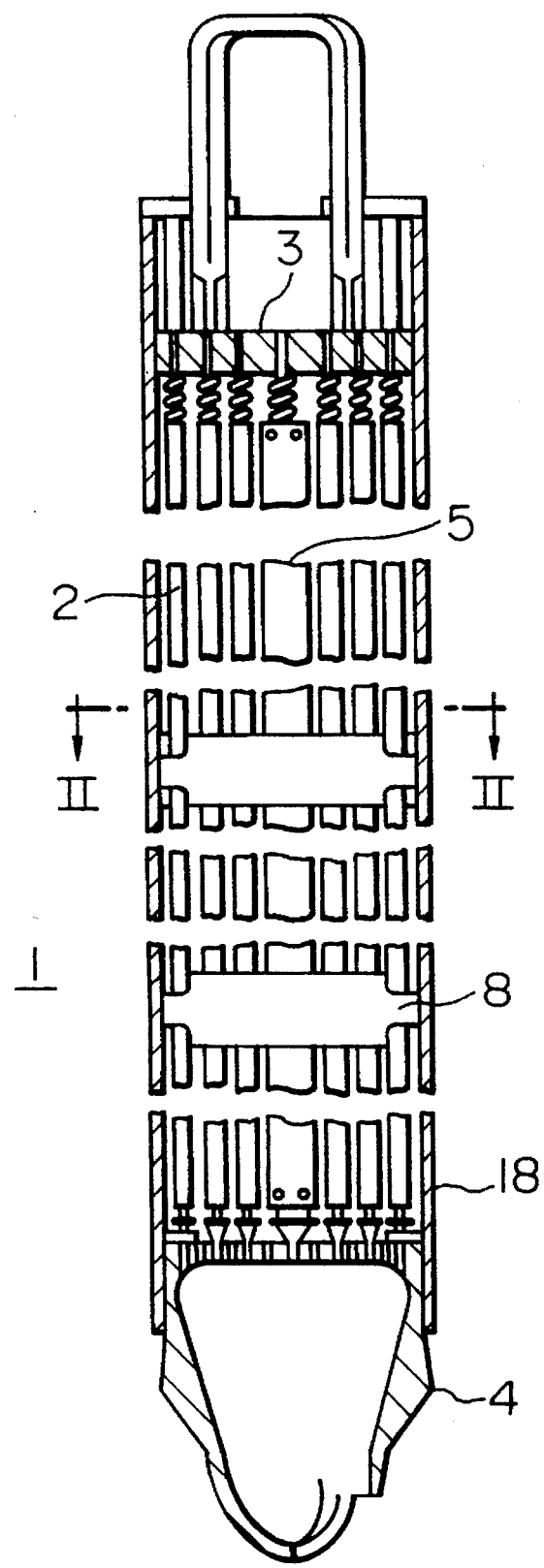
FIG. 1 is a longitudinal cross-sectional view of an embodiment according to the invention.

A fuel assembly according to a preferred embodiment of the present invention will be described with reference to FIGS. 1 and 2. The fuel assembly 1 is provided with a plurality of fuel rods 2, an upper tie plate 3 and a lower tie plate 4 which respectively retain or hold upper and lower ends of the fuel rods 2, a water rod 5 arranged among the fuel rods 2, ferrule spacers 8, and a channel box 18. The water rod 5 is also held at upper and lower ends thereof by the upper tie plate 3 and the lower tie plate 4, respectively. The ferrule spacers 8 retain mutual spacings between the fuel rods 2 to a predetermined pitch. Seven ferrule spacers 8 are provided in an axial direction of the fuel assembly (only two are shown).

Figure 2:
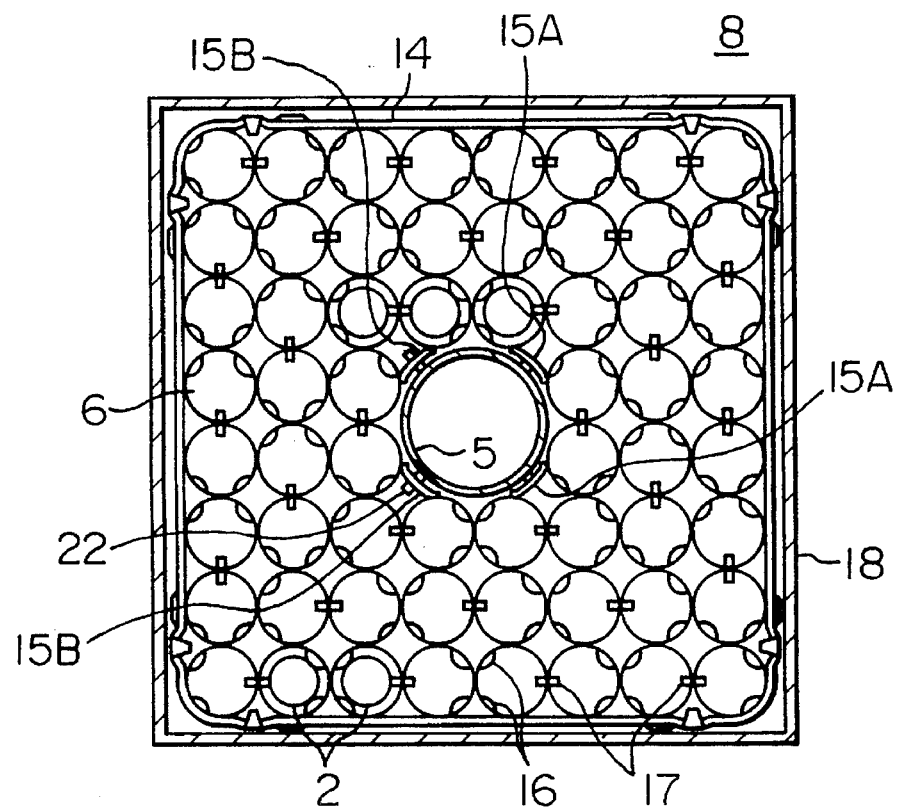
FIG. 2 is a transverse cross-sectional view taken along the line II—II in FIG. 1.
Figure 3:
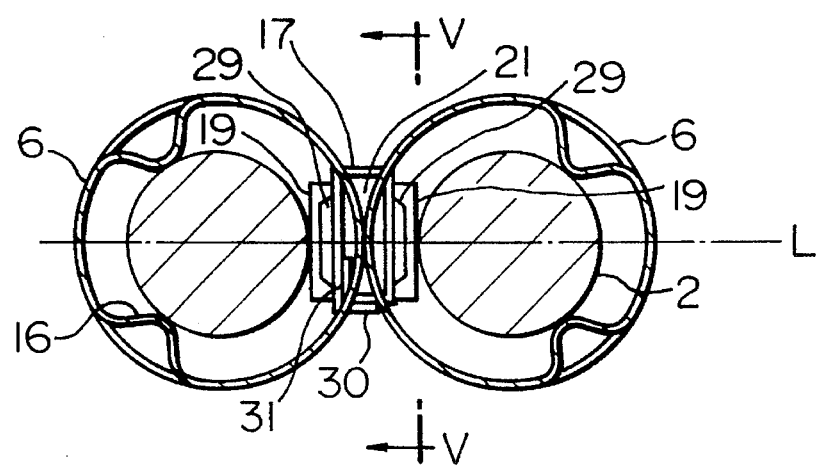
FIG. 3 is a top plan view showing a pair of cells in FIG. 2.

As shown in detail in FIG. 2, the round cells 6 are arranged in the form of a lattice, and the outermost cells 6 are surrounded by a band 14. The channel box 18 mounted on the upper tie plate 3 surrounds a periphery of a bundle which is bundled by the ferrule spacers 8. The adjacent round cells 6 are joined to each other at opposite axial ends thereof by welding. The band 14 is also attached onto the round cells 6 by welding. As shown in FIG. 3, each of the round cells 6 has a tubular wall parts of which project radially inwardly to form a pair of projections 16. A loop spring 17 is disposed between two round cells 6 adjacent to each other. The fuel rod 2 is inserted into the respective round cell 6 (only several fuel rods 2 are shown in FIG. 2) and is supported by a pair of projections 16 and a one loop spring 17. The space 8 has a central bore for the water rod 5 a cross-section of which correspond to four round cells 6. The round cells 6 which face the central bore are joined to each other two by two by support plates 15A and 15B. There are four support plates.

Figure 4:
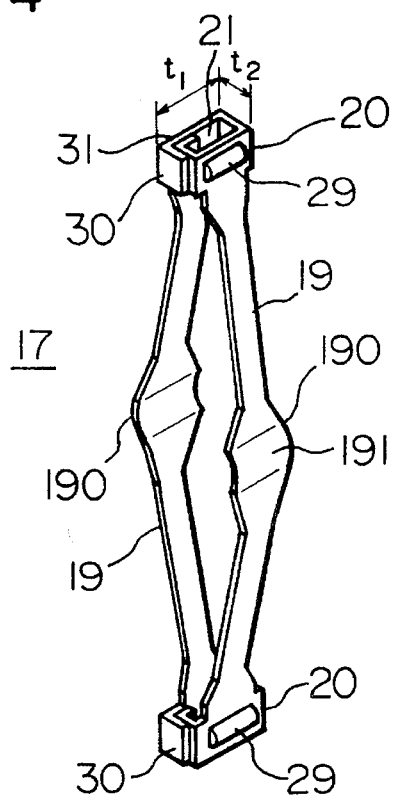
FIG. 4 is a perspective view showing a loop spring in FIG. 3.

As shown in FIG. 4, the loop spring 17 is provided with a pair of spring members 19 and a pair of connections 20 which connect both ends of these spring members 19 to each other. Each spring member 19 is provided at a center portion thereof with a projection 190. Each connection 20 is a tube which has an axial opening 21 a cross-section of which opening is rectangular. The loop spring 17 is made of a thin plate finished in cold rolling having a thickness of about 0.3 mm of nickel-group alloy (for example, nickel-group alloy having C equal to or less than 0.08 wt %, Mn of 0.30 wt %–1.00 wt %, Si equal to or less than 0.05 wt %, Cr of 14.00 wt %–16.00 wt %, Nb of 0.70 wt %–1.20 wt %, Ti of 2.25 wt %–2.75 wt %, Al of 0.40 wt %–1.00 wt %, Fe of 5.00 wt %–9.00 wt % and the remainder of Ni). A press forming is applied to the thin plate and, subsequently, the welding is made to form the connections 20. The loop spring 17 has a free length of about 20 mm, and a free gap between the contact points 191 (of the projections 190) of the spring members 19 is about 5 mm. The loop spring 17 is preferable for being incorporated into the round cell 6 whose height is about 30 mm. Since the loop spring is made of the plate material and is small-sized or miniaturized as far as possible, the loop spring can be made economically. The connections 20 are formed such that nickel-group alloy material plate blank is folded to be partially overlapped, and the overlapped portions are welded to each other. Specifically, a thickness of the peripheral wall of each of the connection 20 which defines the opening 21 is not uniform. The overlapped portions are located at a side wall 31 of the connection 20 which is connected to one spring member 19, and at a side wall 30 extending perpendicular thereto.

Figure 5:
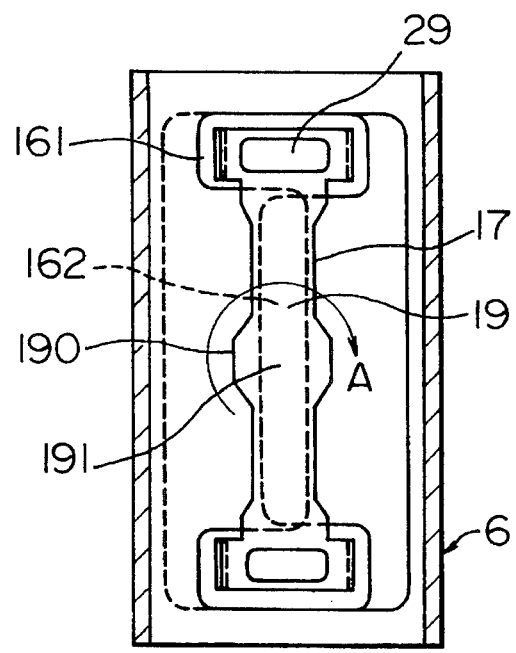
FIGS. 5 and 5B are side views taken along the line V—V in FIG. 3, respectively.
Figure 5A:
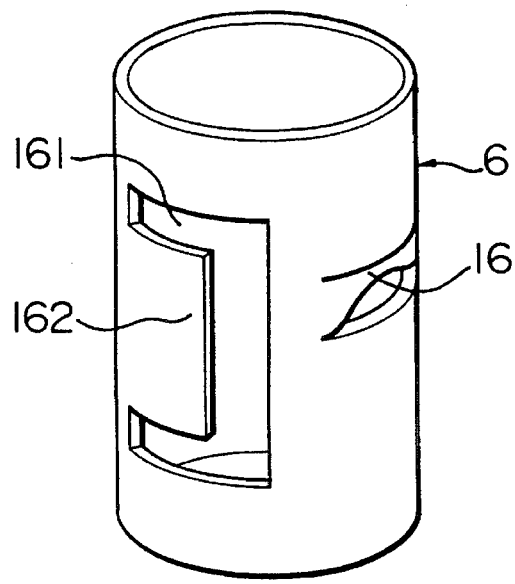
FIG. 5A is a perspective view showing a one cell in FIG. 5.
Figure 5B:
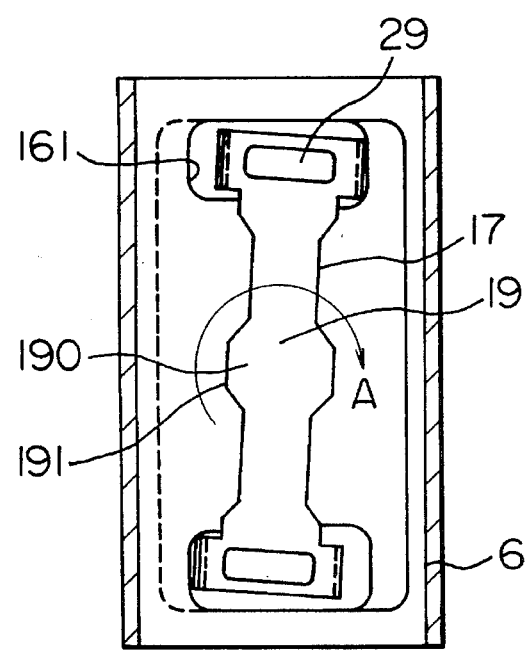

As will be clear from FIGS. 5 and 5A, an inverted C-shaped opening 161 is formed in a peripheral wall of the round cell 6. A projecting portion 162 of one round cell 6 is inserted between spring members 19 of a loop spring 17, and a projecting portion 162 of the other round cell 6 is inserted between the spring members 19 of the loop spring 17 from the opposite directions under a condition in which the other round cell 6 is inverted from a condition illustrated in FIG. 5A. Subsequently, these two round cells are joined to each other by welding. Thus, the loop spring 17 is held by these two round cells 6.

The connection 20 of the loop spring 17 is not uniform in a thickness of the peripheral wall thereof. That is, as shown in FIG. 3, a projection area of the connection 20 is allocated or distributed asymmetrically with respect to a straight line L which passes through axes of the pair of fuel rods 2 which are supported by the spring members 19. When the coolant flows within the fuel assembly 1, it is preferable or desirable that the loop springs support the fuel rods 2 under a steady condition as far as possible. However, since each of the loop springs per se is interposed between the pair of fuel rods 2, the loop spring is rotated or moves to a certain extent within the openings 16 of the round cell 6, around an axis extending through the contact points 191, as shown in FIG. 5. However, since the projection area of the connection 20 of the loop springs 17 in this embodiment is distributed asymmetrically as described above, the coolant flowing through the fuel assembly 1 gives an external force to the loop spring 17 so as to move or rotate it in a specific direction. Specifically, since the rotational direction of the loop springs 17 around the contact point 191 as a rotational center is determined to a direction A, it is possible to hold or maintain the loop spring 17 with being in contact with edges of the opening 161 in the round cell 6, that is, in a stable condition.

Thus, repeated sliding movement between the fuel rods 2 and the spring members 19 of the loop springs 17 is eliminated so that it is possible to restrain them to be damaged.

The overlapped side walls 30 and 31 have function to securely receive and transmit the reaction force in a case where the loop spring 17 is displaced by the fuel rods 2. Furthermore, in a case where a highly dimensional accuracy is required for the loop spring 17, the side wall 30 should be firmly or stably connected by welding. Further, the overlapped side wall 31 not only serves as a stopper for causing no excessive shear stress to occur in the welded portion of the overlapped side wall 30, but also, if the welded portion slips off, secures the function of the loop spring 17.

Of the peripheral wall of the connection 20, a width $t_1$ of the side wall 31 to which the spring member 19 is connected is wider than a width $t_2$ of another side wall 30 to which the spring member 19 is not connected. The side wall 31 is provided with a curved projection 29 which has a narrow top extending perpendicular to a longitudinal direction of the spring member 19.

The projection 29 presents a surface curved in a longitudinal direction of the spring member 19. The projections 29 abut against the fuel rod 2 to restrict or limit excessive movement thereof, in a case where the loop spring 17 receives an excessive compressive force due to the radial movement of the fuel rod 2. Namely, since the movement of the fuel rod 2 is limited by the projections 29, the spring members 19 are prevented from being flexed or deflected more than the necessity. Moreover, since the projection 29 is elongate, even though the loop spring 17 is moves somewhat, the projection 29 is always opposed against the fuel rods 2. Accordingly, it is possible to surely prevent the spring member from being excessively deflected.

In view of that the spring member 19 should be prevented from being deflected excessively, it is desirable that the deflection of the connection 20 per se is reduced as far as possible. The loop spring 17 has the elongate projections 29 on the side walls of the connections 20, which are opposed respectively against the fuel rods 2, as described above. Accordingly, it is possible to reduce the deflection of the connections 20. For example, in a case of a loop spring shown in FIG. 26 of Japanese Patent Examined Publication No. 3-76879, a deflection ratio between a convex portion 4B as a spring member excessive deflection preventing portion, and the spring member is about 0.04. Meanwhile, in a case of the loop spring 17 in this embodiment, the deflection ratio is about 1/10 of that in Japanese Patent Examined Publication No. 3-76879. Further, there is an advantage that the loop spring 17 reduces the maximum deflection on the order of few % by the following equation:

$$(Relative\ Ratio\ of\ Maximum\ Deflection) = (1-0.04)/(1-0.04/10) = 0.96$$

Moreover, since the projection 29 acts as a guide upon insertion of the fuel rod 2 into the round cell 6, it is possible to prevent unnecessary flaws from being generated in surfaces of the fuel rods 2 upon assembling.

Figure 7:
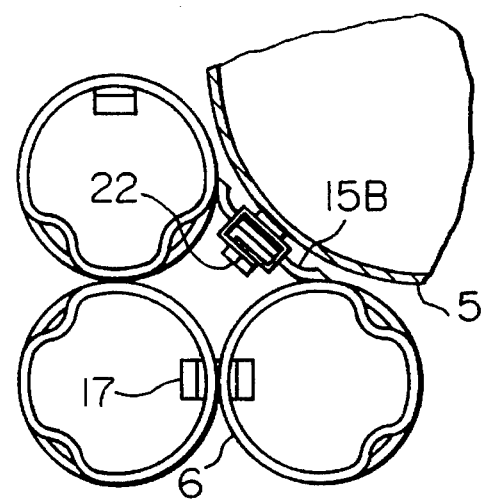
FIG. 7 is a fragmentary top plan view showing a water rod in FIG. 2.
Figure 8:
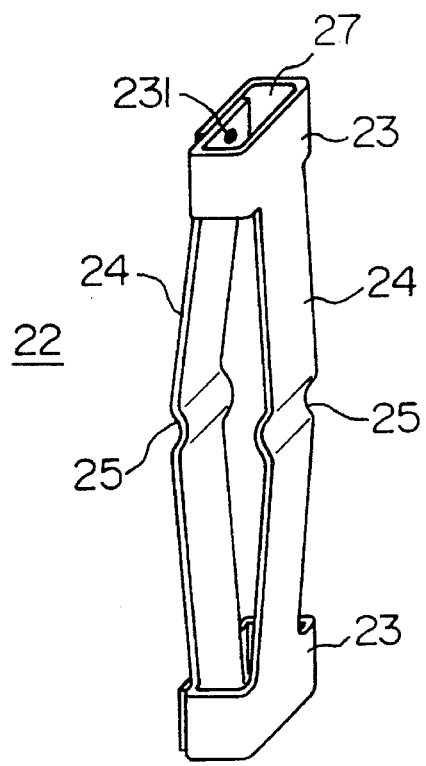
FIG. 8 is a perspective view showing a loop spring in FIG. 7.

As shown in FIG. 2, each of two support plates 15A has a projection abutting against the water rod 5. A loop spring 22 is mounted on each of another two support members 15B (FIG. 7). As shown in FIG. 8, the loop spring 22 has a pair of spring members 24, and a pair of tubular connections 23 which connect these spring members 24 to each other at upper and lower ends thereof. The connection 23 is made by folding a blank to be partially overlapped. The overlapped portions are located to be apart or remote from the water rod 5, and are welded to each other at a point 231. According this, it can be possible to prevent the water rod 5 from being damaged by the welding portion. The spring member 24 has a projection 25 which projects inwardly. The connection 23 is provided with a rectangular opening 27. The loop spring 22 is made by the nickel-group alloy similarly to the loop spring 17.

In connection with the above, the spacer 8 other than the loop springs 17 and 22 is made of zirconium alloy (for example, Zircaloy-2). Configuration or contour in the transverse cross-section of the opening of the connections 20 and 23 may be circular, elliptic or the like.

The water rod 5 is radially supported by the projections of the support plates 15A and by the loop springs 22 in the support plates 15B. The spacers 8 are axially supported by supports provided on the water rod 5.

Figure 6:
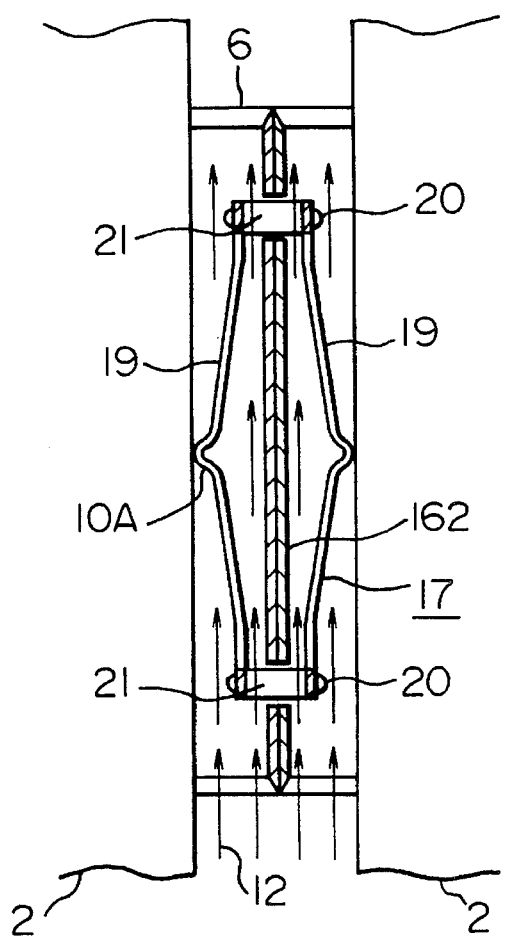
FIG. 6 is a longitudinal cross-sectional view showing flow of coolant within a spacer.

The embodiment arranged as described above has an advantage that occurrence or generation of disturbed coolant flow in a lateral direction accompanied with eddies or vortexes within a narrow coolant passage within each of the round cells is restrained. This will be described in detail with reference to FIG. 6. Coolant 12 flows upwards among the fuel rods 2 into the round cells 6. The coolant 12 can flow upwards along an inner surfaces of the round cells 6 through the opening 21 (27) without being interrupted by the lower connection 20 (23). The coolant 12 flows through the opening 21 (27) in the upper connection 20 (23) to reach above the loop spring 17 (22). In this manner, disturbance of the coolant flow, which would be generated by the connection 20 (23) is remarkably reduced. For this reason, pressure loss of the narrow coolant passage within the round cell 6 is remarkably reduced. This remarkably reduces pressure loss in the spacer 8 and then pressure loss in the fuel assembly 1.

The tubular connection 21 having a rectangular opening improves the rigidity of the loop spring 17 at the upper and lower ends thereof, thereby increasing the urging force against the fuel rods 2 due to the springs 19. For this reason, vibration or oscillation of the fuel rod 2 decreases. Since the projections 190 are in point contact with the fuel rods 2, the areas through which the fuel rods 2 are in contact with the coolant increase so that the cooling efficiency of the fuel rods 2 increases. Furthermore, since the spring members 19 of the loop spring 17 are connected at both ends thereof to each other by the connections 20, and a central portion of each of the spring members 19 projects outwardly, it is possible to insert the fuel rods 2 into the round cells 6 smoothly and readily.

Modifications of the loop spring will be described hereinafter. For example, the modification is obtained by adding any one of the followings arrangements (1)–(3) to the loop spring 17. That is, (1) A tab is integral with other side wall which extends perpendicular to a side wall connected to the spring member and is bent to extend outwardly;

(2) A tab similar to that in the above (1) projects from a central portion of the side wall to face the projection 162 of the round cell 6; and (3) A tab (lead-in tab) projects from the side wall of the connection in a direction oppose to the spring member and is slightly bent inwardly.

With the arrangements (1) and (2), it is possible to finish, with high accuracy, an outer width of the connection, that is, an outer width defined by the pair of projecting tabs. It is possible to reduce a clearance between the tabs and the opening 161 in the cell. Thus, since the tabs act to limit the transverse displacement of the loop spring within the opening 161, it is possible to make a relative positional relationship between the fuel rod and the loop spring accurately, and it is possible to maintain the fuel rods in a condition that the fuel rods are press supported stably. With the arrangement (3), since the lead-in tabs in addition to the projections 29 act as guides at the time when the fuel rods 2 are inserted into the round cells 6 upon assembling, the fuel rods 2 can be readily inserted into the round cells 6, thereby further reducing the possibility that unnecessary defects are generated in the fuel rods 2.

Figure 9:
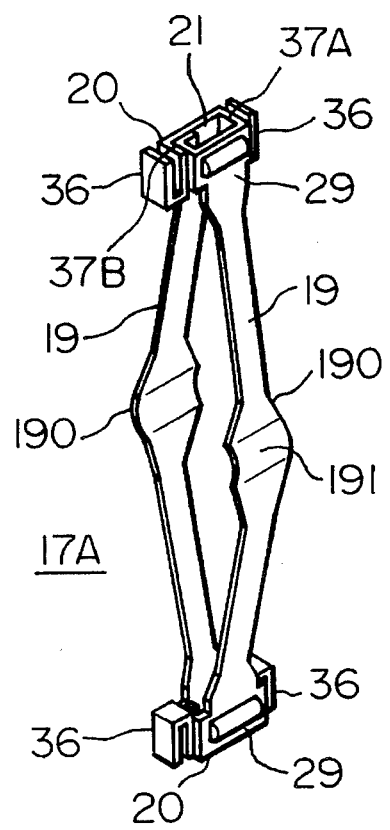
FIGS. 9 to 12 are perspective views showing loop springs in respective other embodiments.

A loop spring 17A shown in FIG. 9 has tabs 36 being integrated into and substantially in parallel with the side walls 37A and 37B with appropriate gaps, which extend perpendicular with the side walls directly connected to the spring members 19. There is a clearance between the connection 20 and the opening 161 in the round cell 6 as shown in FIG. 5, and then the relative position between the loop spring 17A and the fuel rod 2 is fluctuated within the clearance. Since, the supporting condition of the loop spring 17A for the fuel rod 2 is changed due to the above-mentioned fluctuation, it is desirable to reduce the clearance as far as possible. If the outer width of the connection 20 is finished accurately, it is possible to reduce the clearance. However, in the loop spring 17A, a pair of tabs 36 is provided on one connection 20 in order to produce higher accuracy. Specifically, according to the loop spring 17A, it is possible to regulate the outer width of the tab 36 with high accuracy by pressing the formed connection 20, thereby reducing the clearance. The loop spring 17A has the arrangement (1).

Figure 10:
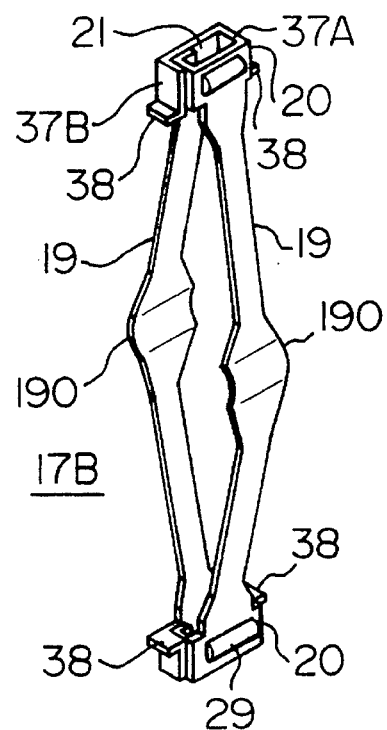
Figure 11:
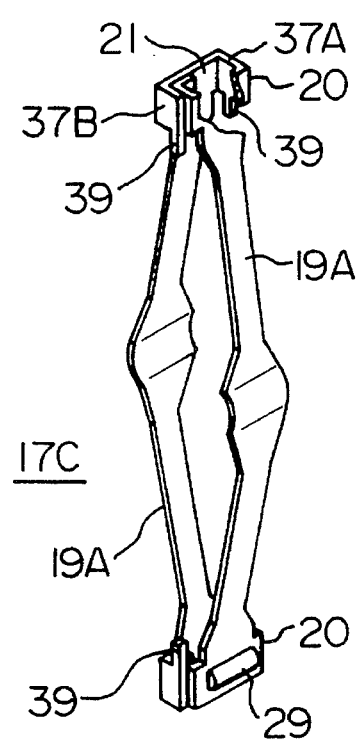
Figure 13:
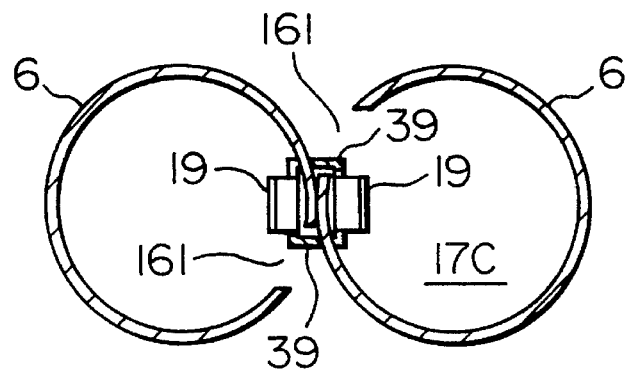
FIG. 13 is a transverse cross-sectional view showing a pair of cells which hold the loop spring in FIG. 11.

A loop spring 17B shown in FIG. 10 has the arrangement (1) and has tabs 38 corresponding to the above mentioned tabs 36, which extend horizontally and perpendicular from axial inner ends of the side walls 37A and 37B. The end surface of each of the tabs 38 is finished by grinding after forming of the connection 20, so that the connection 20 can be formed with highly accuracy. Thus, it is possible to reduce the above mentioned clearance. A loop spring 17C shown in FIG. 11 has the arrangement (2). Tabs 39 extend axial inwardly from axial inner ends of the side walls 37A and 37B. The tab 39 projects to engage with an edge of the opening 161 in the round cell 6, on the side of insertion of the loop spring, as shown in FIG. 13, whereby lateral movement of the loop spring 17C is limited. The tabs 39 are also effective in reduction of the clearance, similarly to the tabs 36 illustrated in FIG. 9.

Figure 12:
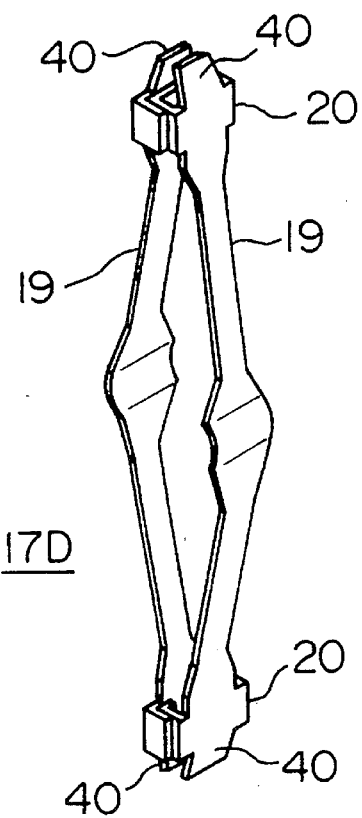

A loop spring 17D shown in FIG. 12 has the arrangement (3). The loop spring 17D includes lead-in tabs 40 longitudinally extending from and beyond the side walls of the connections 20 which are directly connected to the spring members 19. The lead-in tabs 40 are slightly bent inwardly. The lead-in tabs 40 perform a guide function at the time the fuel rods 2 are inserted into the round cells 6 upon assembling of the fuel assembly 1. For this reason, insertion of the fuel rods 2 into the round cells 6 is facilitated, and it is possible to prevent unnecessary defects from being generated on the surfaces of the fuel rods 2. In this connection, in the loop spring illustrated in FIG. 12, the lead-in tabs 40 are provided on both sides of the loop spring 17D. However, it is needless to say that there are produced similar advantages if the lead-in tabs 40 are provided only on one side where the fuel rod 2 is inserted.

What is claimed is:

1. A fuel assembly comprising:

a plurality of fuel rods;

tie plate means for holding opposite ends of said fuel rods; and a spacer for supporting said fuel rods, said spacer including:

a plurality of cells connected with one another, into which said fuel rods are respectively inserted;

a plurality of loop springs held by said cells, each of said loop springs being provided with a pair of resilient members being located in a pair of the cells adjacent to each other and urging said fuel rods radially and with a pair of connecting members connecting axial ends of said resilient members, each of said connecting members having a passage through which coolant flows axially and which is defined by a closed circumferential wall, said connecting member having means for generating on said loop spring a rotational force in a predetermined direction; and openings being formed in a circumferential wall of said cell and receiving said connecting members of said loop spring.

2. A fuel assembly according to claim 1, wherein a thickness of said closed circumferential wall is not uniform.

3. A fuel assembly according to claim 2, wherein said connecting members are tubular in form.

4. A fuel assembly according to claim 3, wherein each of said tubular connecting members has a passage of a rectangular cross-section through which coolant flows axially, wherein each of said tubular connecting members has a pair of opposite side walls to which a pair of said resilient members are connected, and has another pair of opposite side walls, a thickness of which is different from each other.

5. A fuel assembly according to claim 4, wherein one of said another pair of opposite side walls of said tubular connecting member has a plurality of layers.

6. A fuel assembly according to claim 3, wherein a peripheral wall portion of said connecting member except for peripheral wall portions thereof to which a pair of said resilient members of said loop spring are connected has a plurality of layers.

7. A fuel assembly according to claim 2, wherein each of said connecting members has an elongate projection at a location facing said fuel rod, which projects toward said fuel rod and which extends in a transverse direction perpendicular to an axis of said fuel rod.

8. A fuel assembly according to claim 2, wherein said resilient member of said loop spring has both ends connected to said connecting members, and an intermediate portion which is abutted against said fuel rod between said both ends, and wherein a width of said resilient member between said intermediate portion and said end is narrower than that of said end of said resilient member and that of said intermediate portion of said resilient member.

9. A fuel assembly comprising:

a plurality of fuel rods;

a water rod having an outer diameter;

tie plate means for holding opposite ends of said fuel rods and said water rod; and a spacer for holding said fuel rods by a pitch smaller than the outer diameter of said water rod and holding said water rod among said fuel rods, said spacer including:

a plurality of cells connected with one another, into which said fuel rods are inserted respectively;

a plurality of first loop springs held by said cells, each of said loop springs being provided with a pair of first resilient members located in a pair of said cells adjacent to each other and urging said fuel rods radially and with a pair of first connecting members for connecting axial ends of said first resilient members to each other, each of said first connecting members having a passage through which coolant flows axially and which is defined by a closed circumferential wall, said first connecting member having means for generating on said first loop spring a rotational force in a predetermined direction;

openings formed in circumferential walls of said cells adjacent to each other, and receiving said first connecting members of said first loop springs;

a plurality of supporting members mounted onto said cells facing said water rod; and a plurality of second loop springs held by said supporting members, each of said second loop springs being provided with a pair of second resilient members one of which urges said water rod radially and with a pair of second connecting members connecting axial ends of said second resilient members to each other, each of said second connecting members having a passage through which the coolant flow axially and which is defined by the closed circumferential wall.

10. A fuel assembly according to claim 9, wherein a thickness of said closed circumferential wall is not uniform.

11. A fuel assembly according to claim 10, wherein said first connecting members are tubular in form.

12. A fuel assembly according to claim 11, wherein each of said tubular first connecting members has a passage of a rectangular cross-section through which coolant flows axially, wherein each of said first tubular connecting members has a pair of opposite side walls to which a pair of said first resilient members are connected, and has another pair of opposite side walls, a thickness of which is different from each other.

13. A fuel assembly according to claim 12, wherein one of said another pair of opposite side walls of said first tubular connecting member has a plurality of layers.

14. A fuel assembly according to claim 11, wherein a peripheral wall portion of said first connecting member except for peripheral wall portions thereof to which a pair of said first resilient members of said first loop spring are connected has a plurality of layers.

15. A fuel assembly according to claim 10, wherein each of said first connecting members has an elongate projection at a location facing said fuel rod, which projects toward said fuel rod and which extends in a transverse direction perpendicular to an axis of said fuel rod.

16. A fuel assembly according to claim 10, wherein said first resilient member of said first loop spring has both ends connected to said first connecting members, and an intermediate portion which is abutted against said fuel rod between said both ends, and wherein a width of said first resilient member between said intermediate portion and said end is narrower than that of said end of said first resilient member and that of said intermediate portion of said first resilient member.

17. A fuel assembly according to claim 9, wherein said second connecting member has a passage through which coolant flows axially and which is defined by a closed circumferential wall which is partially overlapped, and wherein the overlapped portions are welded to each other at a portion remote from said water rod.

18. A fuel assembly according to claim 1, wherein said connecting member having means for generating on said loop spring a rotational force in a predetermined direction includes said connecting member being configured to provide a projection area distributed asymmetrically with respect to a straight line which passes through axes of a pair of said fuel rods supported by said loop springs so as to substantially prevent repeated sliding movement from occurring between said fuel rods and said resilient members of said loop springs and thereby avoid damage to at least one of said loop springs and said fuel rods.

19. A fuel assembly according to claim 9, wherein said first connecting member having means for generating on said first loop spring a rotational force in a predetermined direction includes said first connecting member being configured to provide a projection area distributed asymmetrically with respect to a straight line which passes through axes of a pair of said fuel rods supported by said first loop springs so as to substantially prevent repeated sliding movement from occurring between said fuel rods and said first resilient members of the first loop springs and thereby avoid damage to at least one of said first loop springs and said fuel rods.

* * * * *